Oct. 12, 1943.   J. R. HOBSON   2,331,688
METHOD AND APPARATUS FOR MAKING HOLLOW ARTICLES OF PLASTIC MATERIAL
Filed May 13, 1938
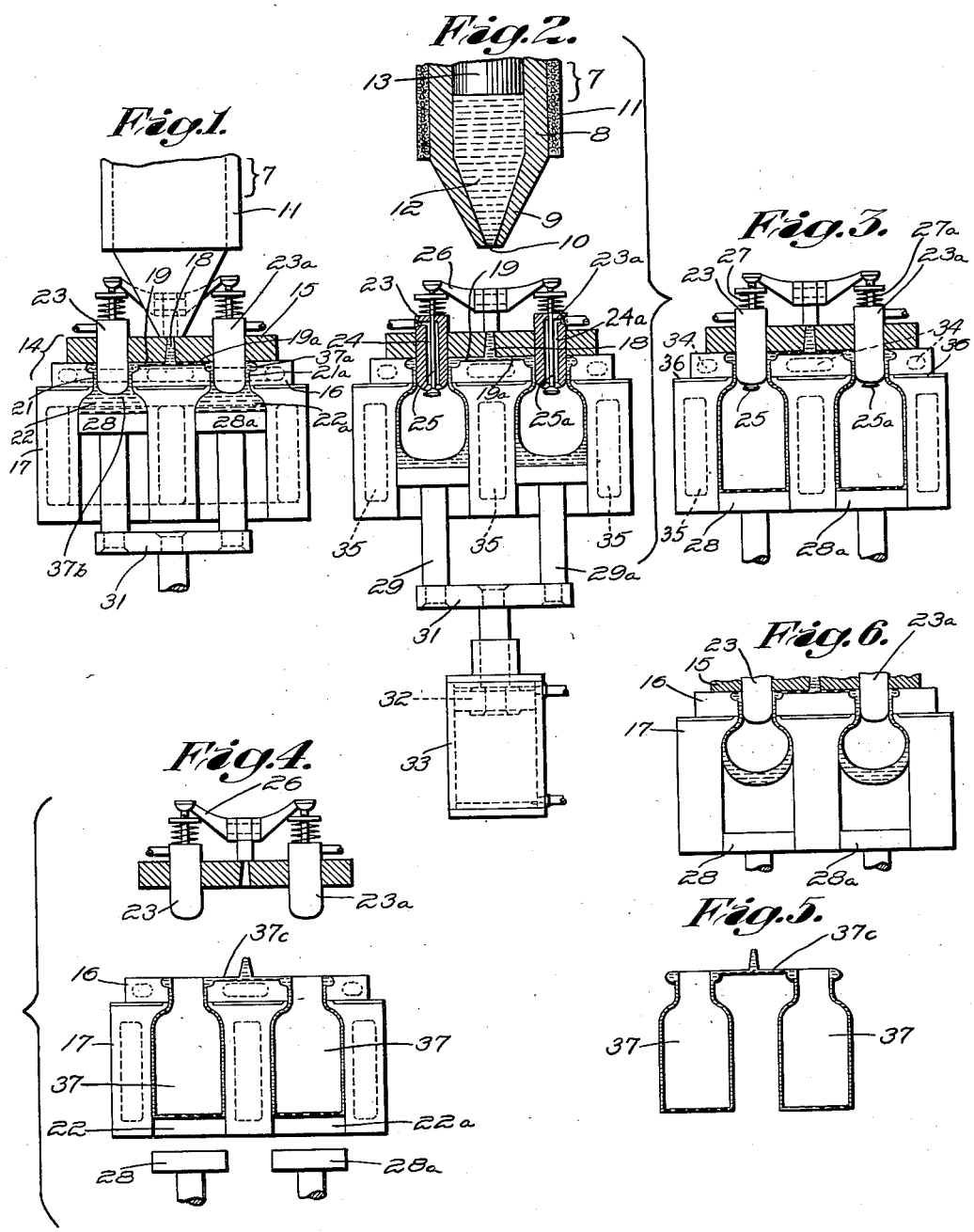
Inventor
John R. Hobson
by Brown & Parham
Attorneys
Witness
W. B. Thayer Patented Oct. 12, 1943

2,331,688

UNITED STATES PATENT OFFICE 2,331,688

METHOD AND APPARATUS FOR MAKING HOLLOW ARTICLES OF PLASTIC MATERIAL

John R. Hobson, West Hartford, Conn., assignor to Hartford-Empire Company, Hartford, Conn., a corporation of Delaware Application May 13, 1938, Serial No. 207,700

12 Claims. (Cl. 18—5)

This invention relates to methods and apparatus for making hollow articles from organic plastic materials and has particular relation to the manufacture of such articles by injection of organic material while in plastic condition into dies which impart the desired shape to the articles. The terms "injection," "injecting," or "injection molding" as understood in the art of injection molding organic plastic materials and as used herein means subjecting such material to heat and pressure in an injection device and forcing it into a die or mold cavity closed, except where the material enters to fill the cavity and thus mold the plastic to predetermined size and shape. Injection molding differs from extrusion molding wherein the plastic material is shaped by forcing it through a nozzle or die into the open air or into a space which is unconfined or only partly confined by molding surfaces. Therefore, in extrusion molding a die or mold cavity is not filled and the plastic is not formed to predetermined size and shape thereby, as is the case in injection molding.

In the methods and apparatus heretofore proposed for making hollow articles by injection of organic plastics it is necessary to employ cores which are set in the dies and around which the hollow articles are formed. Such cores may be of the permanent or indestructible type or they may be molded from fusible or destructible material, as where a permanent core could not be withdrawn from an article because of the opening into the article being smaller than the cavity formed therein. Examples of such articles are narrow neck containers or bottles the neck portions of which are narrower than the body portions thereof.

However, the use of cores is inconvenient and adds to the cost of production. The making of the cores themselves involves added expense as also does the setting of the cores in the dies and the separation of the cores from articles and this is true where special core setting and pulling mechanisms are provided as well as in operations where the cores are manually set and withdrawn.

The general object of the present invention is to provide a novel method of and novel apparatus for producing hollow articles by the injection of organic plastic material into a die or mold and in which the major portions of said articles are made hollow without the use of cores. The accomplishment of this object results in substantial savings in the cost of producing hollow articles from organic plastics.

A further object of the invention is to provide a novel method and novel apparatus of the above character in which organic plastic material is injected into a die and expanded into a hollow article of the desired shape in said die.

Another object of the invention is to provide a novel method and apparatus of the above character by the employment of which organic plastic material may be injected into a plurality of die cavities from a single source of supply, and the charges thus injected expanded into hollow articles in said die cavities.

Further objects and advantages of the invention will be pointed out in, or will become apparent from, the detailed description which follows and which refers to the accompanying drawing which illustrates the apparatus and method of the invention.

In said drawing:

Figs. 1 to 4 inclusive are views in vertical sectional elevation of portions of apparatus embodying the invention, said views depicting successive steps in the performance of the novel method;

Fig. 5 is a view in central vertical section of hollow articles which may be produced in practicing the invention; and Fig. 6 is a view similar to Fig. 2 showing a modification of the method illustrated in Fig. 2.

Referring in detail to the drawing, there is partially shown at 7 plastic injection apparatus of known type and comprising a cylindrical casing which terminates in nozzle 9 containing a restricted outlet 10. Casing 8 is surrounded by an electric heating element 11 for heating plastic material 12 which is subjected to pressure by a piston 13 in said casing.

The combined heat and pressure in the casing makes material 12 sufficiently plastic for injection and the lowering of piston effects such injection. It will be understood that any suitable apparatus for plasticating the material and injecting it may be used in lieu of that shown in the drawing.

The injecting device 7 is adapted to cooperate with the die structure indicated generally at 14 and which comprises a head or plate 15, neck die or mold 16 and body die or mold 17. The head 15 has a centrally located sprue passage 18 therein, outwardly tapered as shown, and with which outlet 10 of the injecting device may register. Gates 19, 19a formed in neck die 16 lead in opposite directions from passage 18 to the neck forming cavities 21, 21a in neck die 16, which cavities are aligned with body forming cavities 22, 22a in die portion 17.

The neck and body dies 16 and 17 preferably are formed in mating sections, only one section of each being shown. These die sections may be mounted for opening and closing movements and clamped in closed positions by suitable means, not shown.

The neck cavities 21, 21a, have cores or pins 23, 23a, centrally positioned therein by head 15 in which they are mounted. Said pins have passages 24, 24a, therein for the passage of air under pressure, or other medium, into the respective die cavities. Valves 25, 25a which seat on the inner ends of pins 23, 23a are opened by the descent of a pivoted bifurcated lever 26, which engages the tops of the valve stems, and closed by springs 27, 27a when the lever is raised.

The cavities 22, 22a contain movable die members 28, 28a in the form of pistons or bottom forming members slidable in the respective cavities. The rods 29, 29a of said members are connected to crosshead 31 which in turn is connected to a piston 32 in cylinder 33. Thus, piston 32 serves to reciprocate members 28, 28a in cavities 22, 22a.

In order to control the temperature of the die members 16 and 17 they may respectively be provided with internal passages as indicated at 34 and 35, for circulation of temperature controlling medium therethrough. The neck die or mold 16 and body die or mold 17 may be insulated from one another by means of an asbestos gasket as shown at 36 which permits independent temperature control of the dies 16 and 17. Though not so shown, bottom forming members 28, 28a also may contain passages for temperature controlling medium.

In performing my novel method as shown in Fig. 1, the parts of the die structure 14 are held in assembled relation with members 28, 28a in raised positions and valves 25, 25a closed. The injecting device 7 and die structure 14 are now brought into engagement (by suitable means, not shown) so that outlet 10 registers with sprue passage 18 after which piston 13 is lowered to inject plastic organic material through the sprue and gates into the die cavities and around the pins 23, 23a until the cavities are filled. There is thus formed in each cavity a preform or blank each consisting of a hollow neck finish portion 37a and a solid body portion 37b.

The injecting device 7 and die structure 14 are now disengaged as shown in Fig. 2. This separates the material in outlet 10 of the device 7 from that in sprue passage 18 of head 15. Valves 25, 25a are now opened to admit air or other medium under pressure through pins 23, 23a into the die cavities and the bottom forming members 28, 28a are lowered so that the initial cavities formed by pins 23, 23a are enlarged and the blanks expanded to hollow form.

As illustrated in Figs. 2 and 3, the members 28, 28a are lowered as the blanks are expanded so that such expansion is controlled and regulated thereby throughout the entire operation, that is, until the blanks are expanded to the desired length and the hollow articles are completely formed as shown in Fig. 3.

If preferred, however, members 28, 28a may be moved to their lowermost positions before expansion begins so that most of the expansion of the blanks is effected out of contact with said members as illustrated in Fig. 6. In this procedure, the blanks will be expanded until they finally contact the members 28, 28a and the hollow articles are completed.

It will be observed that in both embodiments of the invention the neck and shoulder portions of the blanks are held in the mold cavities in which they are initially formed while the blanks are being expanded. In other words, the blanks are held against bodily movement during the expanding operation. In the form illustrated in Fig. 6 and likewise in Fig. 2, there is little sliding contact of the plastic with the mold surface, this having the advantage of preventing scratching of the surface of the plastic due to imperfections in the surfaces of the mold cavities. This is particularly true in Fig. 6 where the expansion of blanks causes a kind of unrolling of the plastic material against the walls of the mold cavity as distinguished from a positive sliding movement.

When the expansion of the blanks is finished, valves 25, 25a are closed and head 15 disengaged from the neck mold or die 16 as shown in Fig. 4. This also withdraws pins 23, 23a from the necks of the articles. The members 28, 28a also may now be withdrawn from cavities 22, 22a. This leaves the hollow articles 37, 37 in the die portions 16 and 17, connected by the gate and sprue material 37c. See Figs. 4 and 5. The articles may now be discharged as a unit from the die structure by opening the dies 16 and 17 after which they are finished by cutting off the gate and sprue material 37c at the points where it connects with the necks of the articles.

It will be understood that the temperature of the various parts of the die structure will be controlled in accordance with the characteristics of the material from which the articles are fabricated. The invention is not limited to the use of any particular kind of material but may be employed in forming cellulose esters or ethers, and natural or synthetic gums or resins of either the thermoplastic or thermosetting type or mixtures thereof, capable of being softened by heat and injected through narrow passages into the die cavities and expanded therein before setting or hardening.

In the illustrated embodiment it may be assumed that the material employed is cellulose acetate with suitable plasticizer but substantially or entirely free of volatile solvents. In forming such material into articles, the neck die or mold 16 may be cooled to set the neck portions 37a before expansion of the blanks begins, to insure separation of the material from the ends of pins 23, 23a. The body mold or die 17 and members 28, 28a may be kept warm or hot during injection and expansion to insure that the body portions 37b will remain sufficiently plastic for such expansion. In any event, the body portions 37b of the blanks will retain a substantial amount of the initial heat of the material which will permit or assist the expansion and will reheat portions of the blanks chilled by contact with die parts such as pins 23, 23a.

When expansion of the blanks is completed, a cooling medium may be circulated through body die or mold 17 (and if necessary through members 28, 28a) to set the material in the hollow articles.

If a material is used of the thermosetting type, the die parts will be cooled (or not heated substantially) to maintain plasticity and workability and heated to cause the material to set or harden.

The temperature of the material may also be controlled to greater or less extent by regulating the temperature of the air (or liquid medium such as water or oil) employed in expanding the blanks. Thus hot air may be used in expanding thermoplastic material which will help keep the material plastic interiorly while the die keeps it plastic exteriorly.

Suitable mechanism, not shown, may be provided for automatically operating the various parts of the apparatus disclosed in the drawing.

Although the pins or cores 24 and 24a form parts of the apparatus disclosed, these cores are provided only for forming initial openings for the beginning of the blowing or expanding operations and may in some cases be omitted. However, the major portions of the articles (the body portions) may be formed in the dies into which the material is injected, without the use of cores extending a substantial distance thereinto. While certain types of articles now produced with cores cannot be produced without cores according to the invention, nevertheless, the invention can advantageously be used in producing a large class of hollow articles which previously required the use of permanent or destructible cores and therefore substantial savings may be made by producing such articles according to this invention. Narrow neck containers or bottles such as illustrated are examples of the types of articles upon which such savings may be realized.

Various changes may be made in the details of apparatus and in the manner of practicing the invention and types of hollow articles other than those illustrated produced, without departing from the scope of the appended claims.

What I claim is:

1. The method of forming hollow articles from organic plastic material which comprises plasticating such material under heat and pressure in an injection device, injecting a solid stream of such material in plastic condition from said device into a closed die to fill the die to form a blank by injection molding, and expanding the said blank while said blank retains its initial heat in the die to form a hollow article, by moving outwardly of the die a bottom forming portion thereof to permit such expansion, and applying a fluid pressure medium to the interior of the blank to effect such expansion, the blank being held against bodily movement relative to the die as it is expanded therein.

2. The method of forming hollow articles from organic plastic material which comprises plasticating such material under heat and pressure in an injection device and injecting a solid stream of the material in plastic condition from said device into the closed cavity of a die until said cavity is filled, and expanding the injected plastic material in the die while said plastic material retains its initial heat to final shape by the admission of a fluid pressure medium into said injected material and by enlarging the die cavity.

3. The method of forming hollow articles from organic plastic material which comprises plasticating such material under heat and pressure in an injection device, injecting a solid stream of such material in plastic condition and in thin and solid cross section from said device into the closed cavity of a die until said cavity is filled, enlarging the die cavity, and introducing a fluid medium under pressure into the injected material to expand the injected material while said material retains its initial heat into the final shape of a hollow article in the enlarged die cavity.

4. The method of forming hollow articles from organic plastic material which comprises plasticating such material under heat and pressure in an injection device, injecting a solid stream of such material in plastic condition from said device into a plurality of closed die cavities simultaneously to fill said cavities, and introducing a fluid pressure medium into said injected material to expand the injected material therein while said plastic material retains its initial heat and form hollow articles of final shapes therefrom in said die cavities, the said cavities being enlarged to the final shapes of the articles to permit such expansion.

5. The method of forming hollow articles from organic plastic material which comprises plasticating such material by heat and pressure in an injection device, injecting a solid stream of such material in plastic condition from said device into a plurality of die cavities until said cavities are filled, enlarging said closed die cavities, and applying fluid pressure medium to the interior of the injected material to expand said material while said plastic material retains its initial heat and form a plurality of hollow articles in final shapes in said cavities.

6. The method of forming hollow articles from organic plastic material which comprises plasticating such material under heat and pressure in an injection device, injecting a solid stream of such material in plastic condition into a closed die cavity until said cavity is filled, and simultaneously applying a fluid pressure medium to the interior of said material while said plastic material retains its initial heat and enlarging said cavity to form a hollow article in final shape in said cavity.

7. The method of forming hollow articles from organic plastic material which comprises plasticating organic plastic material under heat and pressure in an injection device and injecting a solid stream of such material from said device through connecting gates into the cavities of a die until said cavities are filled, enlarging said die cavities, expanding the injected material while said plastic material retains its initial heat into hollow articles in final shapes in said die cavities by applying a fluid pressure medium to the interior of said injected material, discharging the articles connected by gate material, and removing the gate material from said articles.

8. The method of forming containers from organic plastic material which comprises plasticating said material under heat and pressure in an injection device and injecting a solid stream of said material from said device into the cavity of a die until said cavity is filled to form a blank comprising a neck finish portion and a body portion, enlarging the die cavity, and applying a fluid pressure medium to the interior of the blank to expand the blank while said blank retains its initial heat into the final shape of a hollow container in said die.

9. The method of forming a narrow neck container from organic plastic material which comprises plasticating such material under heat and pressure in an injection device, forming a blank from such material having a neck finish and body portion by injecting a solid stream of such material from said device into a die cavity until said cavity is filled, and expanding said blank while said blank retains its initial heat to hollow and final form by enlarging said die cavity and applying a fluid pressure medium to the interior of said blank.

10. Apparatus for forming hollow articles from organic plastic material which comprises means for plasticating such material and injecting it in a solid stream into a die cavity, a die structure having a closed cavity therein, a movable member slidable in said cavity, means for holding said member inwardly of the cavity during the injection of material therein and for moving said member outwardly of the cavity to enlarge said cavity to the final shape of the articles to be produced, and means for introducing a pressure medium into said cavity to expand the injected material into the final shape of a hollow article in said cavity.

11. Apparatus for forming hollow articles from organic plastic material which comprises a single device for plasticating and injecting a solid stream of such material into a die, a die structure comprising a plurality of closed cavities, said structure having passages therein for the flow of material from said device into said cavities, movable members slidable in said die cavities, means for holding said members inwardly of said cavities during the injection of plastic material therein and for moving such members outwardly of the cavities after such injection is completed, and means for admitting a pressure medium into said die cavities to expand injected material contained therein into hollow articles in said die cavities.

12. Apparatus for forming containers from organic plastic material which comprises a device for plasticating such material and injecting it into a die, a die structure comprising a head, a sprue passage therein for receiving material from said device, a neck forming die engaging said head and having a gate leading from said sprue passage to the cavity therein, a pin carried by said head and extending into said cavity, said pin having a passage therethrough for pressure medium, a body forming die engaging said neck forming die, a bottom forming member slidable in the last named cavity, means for holding said member in an inner position while plastic material is injected into said die structure to form a blank, and for moving said member to an outer position after such injection, and means for admitting said pressure medium through the passage in said pin to expand said blank into a hollow article in the die structure.

JOHN R. HOBSON.